(12) United States Patent
Leone et al.

(10) Patent No.: US 9,206,747 B2
(45) Date of Patent: Dec. 8, 2015

(54) METHOD AND SYSTEM FOR ADJUSTING ENGINE THROTTLES

(75) Inventors: Thomas G. Leone, Ypsilanti, MI (US); Joseph Norman Ulrey, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 380 days.

(21) Appl. No.: 13/483,612

(22) Filed: May 30, 2012

(65) Prior Publication Data

US 2013/0318966 A1  Dec. 5, 2013

(51) Int. Cl.
| | | |
|---|---|---|
| *F02D 23/00* | (2006.01) | |
| *F02D 9/00* | (2006.01) | |
| *F02D 41/04* | (2006.01) | |
| *F02D 41/00* | (2006.01) | |

(52) U.S. Cl.
CPC .............. *F02D 9/00* (2013.01); *F02D 41/0002* (2013.01); *F02D 41/0085* (2013.01); *F02D 41/04* (2013.01); *F02D 23/00* (2013.01); *F02D 2200/0404* (2013.01); *F02D 2200/0406* (2013.01); *Y02T 10/42* (2013.01)

(58) Field of Classification Search
CPC ..... F01D 17/146; F02B 37/22; F02D 35/027; F02D 41/0007; F02D 2200/0404; F02D 2200/0406; F02D 23/00; F02D 41/0002; F02D 41/0085; F02D 41/04; F02D 9/00; Y02T 10/42
USPC ............... 60/605.1, 602, 611; 123/319, 337; 180/197
See application file for complete search history.

(56) References Cited

U.S. PATENT DOCUMENTS

| | | | | |
|---|---|---|---|---|
| 3,386,427 A | * | 6/1968 | Powell et al. | 123/459 |
| 4,200,120 A | * | 4/1980 | Kimata et al. | 137/613 |
| 4,769,994 A | * | 9/1988 | Hirabayashi | 60/602 |
| 5,054,439 A | | 10/1991 | Akagi et al. | |
| 5,168,954 A | | 12/1992 | Nakaniwa et al. | |
| 5,823,163 A | | 10/1998 | Hoshi | |
| 5,970,948 A | | 10/1999 | Yasuoka | |
| 6,895,927 B2 | | 5/2005 | Fuwa | |
| 8,176,894 B2 | | 5/2012 | Ulrey et al. | |
| 2008/0098734 A1 | * | 5/2008 | Olsson | 60/605.1 |
| 2010/0242877 A1 | | 9/2010 | Shiomi et al. | |
| 2011/0132322 A1 | * | 6/2011 | Boyer et al. | 123/337 |

FOREIGN PATENT DOCUMENTS

WO    WO 9821461 A1 *  5/1998

OTHER PUBLICATIONS

Leone, Thomas G. et al., "Method and System for Improving Engine Starting," U.S. Appl. No. 13/326,150, filed Dec. 14, 2011, 48 pages.
Pursifull, Ross Dykstra et al., "Method and System for Adjusting Engine Throttles," U.S. Appl. No. 13/483,670, filed May 30, 2012, 40 pages.

* cited by examiner

*Primary Examiner* — Kenneth Bomberg
*Assistant Examiner* — Paul Thiede
(74) *Attorney, Agent, or Firm* — Julia Voutyras; Alleman Hall McCoy Russell & Tuttle LLP (57) ABSTRACT

An engine system and method for operating an engine including a central throttle and a port throttle is disclosed. In one example, the central throttle and port throttle are adjusted to improve air flow distribution to engine cylinders. The system and method may be particularly beneficial for turbocharged engines.

19 Claims, 4 Drawing Sheets

METHOD AND SYSTEM FOR ADJUSTING ENGINE THROTTLES

BACKGROUND/SUMMARY

Performance and efficiency of an engine may be improved by combining a central throttle with port throttles. The central throttle regulates air flow into a plurality of cylinders while each port throttle regulates air flow into a single cylinder. In one example, a central throttle may be positioned in an engine air intake system upstream of an engine air intake manifold that routes air from the central throttle to engine cylinders. Intake manifold runners direct air from the intake manifold to cylinder intake ports. A port throttle positioned within each cylinder intake port, or alternatively within each intake manifold runner, regulates air flow into an individual engine cylinder. However, cylinder charge maldistribution between engine cylinders may occur at lower engine loads when a central throttle is combined with port throttles.

Central and port throttles may also be combined with a turbocharger to improve engine output torque. However, turbocharger lag (e.g., delayed response time) may occur in systems with a central throttle and port throttles due to increased intake manifold filling time and/or throttle positioning that may enhance steady-state engine operation but that may also reduce transient engine performance.

The inventors herein have recognized the above-mentioned limitations and have developed an engine operating method, comprising: operating an engine with a central throttle and a plurality of port throttles; and increasing a port throttle opening amount and decreasing a central throttle opening amount in response to a flow distribution difference between the plurality of port throttles greater than a threshold flow distribution difference and engine air flow less than a threshold air flow. Further, in one example, the inventors adjust the central throttle and the port throttle such that a greater pressure drop occurs across the port throttle than the central throttle in response to turbine speed less than a threshold.

By increasing a port throttle opening amount and decreasing a central throttle opening amount, it may be possible to improve charge distribution between engine cylinders. In particular, use of port throttles to regulate cylinder air flow can be decreased during conditions when small changes in port throttle angle can have a large effect on cylinder charge. Instead, flow to the cylinder can be regulated via the central throttle. In this way, the possibility of cylinder maldistribution may be reduced. Additionally, the central throttle opening amount may be increased while the port throttle opening amount is decreased to allow the intake manifold to fill with air so that a turbocharger coupled to the engine spins up more rapidly when the port throttles are opened in response to an increased accelerator demand.

The present description may provide several advantages. Specifically, the approach may provide improved transient torque response time. Further, the approach may provide improved cylinder air-fuel control at lower engine loads, thereby improving engine emissions. Further still, portions of the approach may be applied to naturally aspirated engines.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
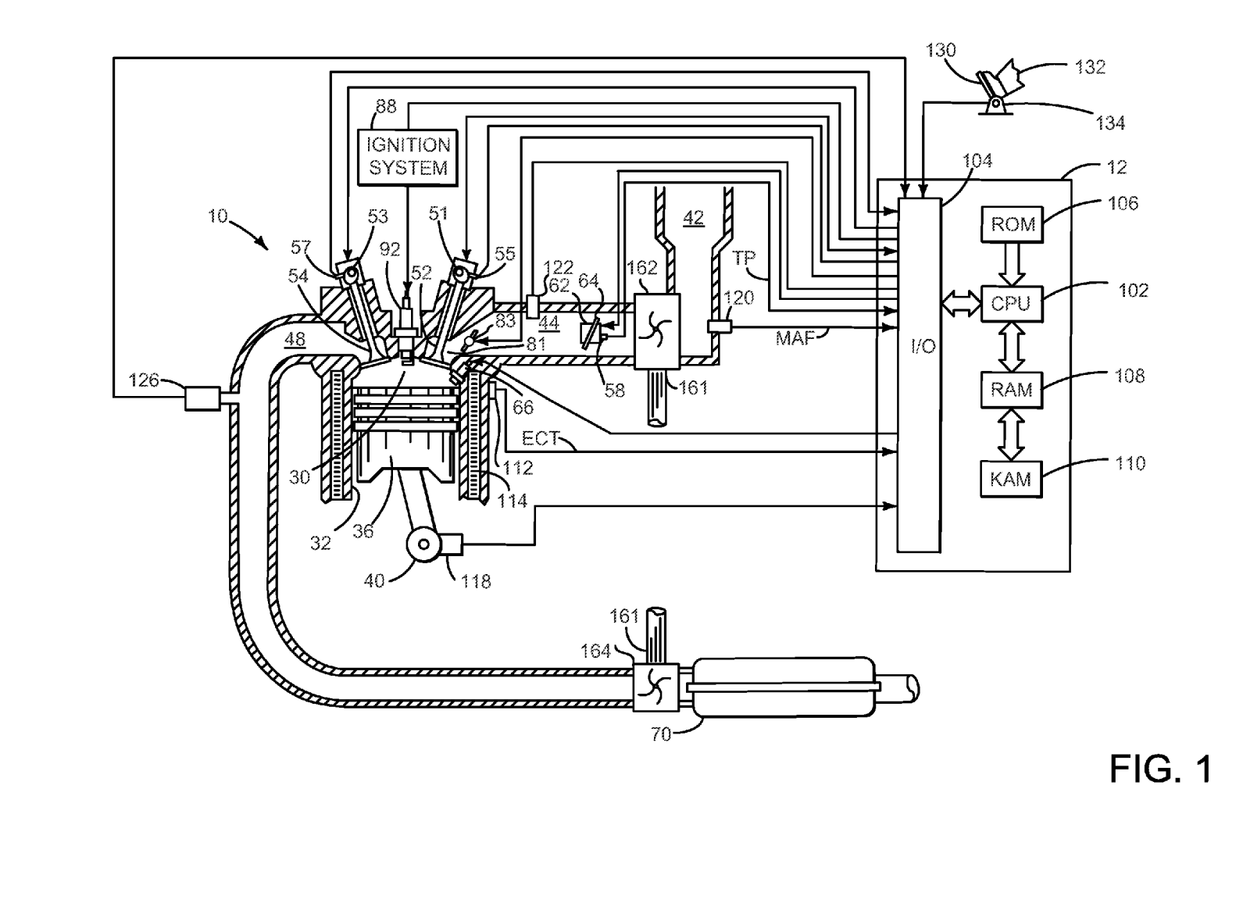
FIG. 1 shows a schematic depiction of an engine.

The present description is related to controlling port throttles of an engine as shown in the example of FIG. 1. In one example, a central throttle and port throttles are adjusted together to provide improved engine operation at low engine loads and improved engine torque response. Central and port throttles may be controlled according to the method of FIG. 4 and the engine map of FIG. 2 to provide the operating sequence illustrated in FIG. 3.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width provided by controller 12. Fuel is delivered to fuel injector 66 by a fuel system (not shown) including a fuel tank, fuel pump, and fuel rail (not shown).

Intake manifold 44 is supplied air by compressor 162. Exhaust gases rotate turbine 164 which is coupled to shaft 161, thereby driving compressor 162. In some examples, a bypass passage is included so that exhaust gases may bypass turbine 164 during selected operating conditions. Further, a compressor bypass passage may be provided in some examples to limit pressure provided by compressor 162.

In addition, intake manifold 44 is shown communicating with central throttle 62 which adjusts a position of throttle plate 64 to control air flow from engine air intake 42. Central throttle 62 may be electrically operated. Port throttle 83 controls air flow into cylinder 30 via restricting or opening intake port 81. In engines with a plurality of cylinders a plurality of individually controlled port throttles may be provided so that port throttle of a first cylinder may be positioned differently from port throttles of another cylinder.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Figure 2:
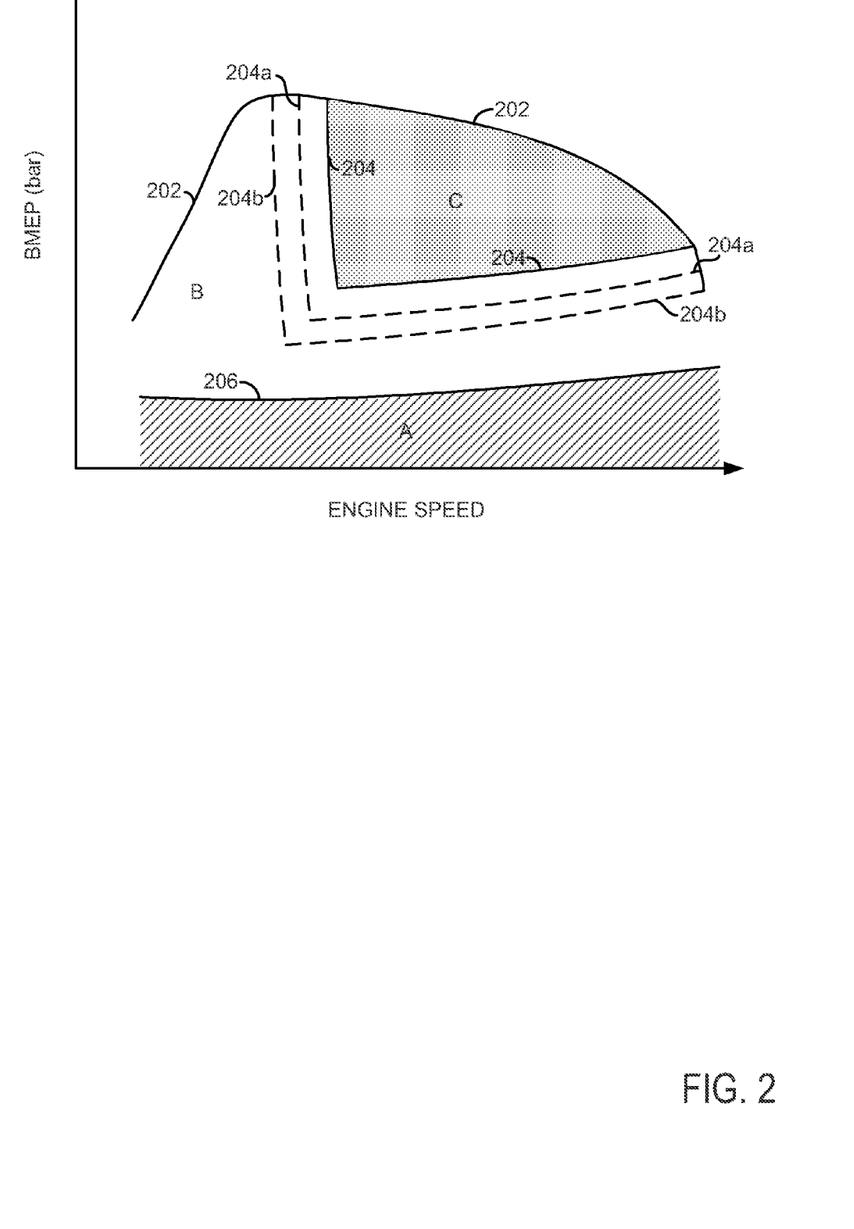
FIG. 2 shows an example engine operating mode map.

Referring now to FIG. 2, an example engine operating mode map is shown. The map includes an X-axis labeled engine speed and a Y-axis labeled brake mean effective pressure (BMEP). BMEP increases in the direction of the Y-axis arrow. Engine speed increases in the direction of the X-axis arrow.

Region A is shown as a shaded area that lies below curve 206. Region A is a low engine load region where air flow maldistribution between engine cylinders may occur when port throttles are opened a small amount to limit cylinder air charge. Maldistribution may result from clearance differences between port throttles and intake ports or other tolerances such as small differences in port throttle angle. Therefore, in region A, port throttles are opened to an extent where a larger pressure drop occurs across the central throttle than a port throttle during an intake stroke of a cylinder receiving air via the port throttle.

Region B is an unshaded area that lies above curve 206 and between curves 202 and 204. Region B is a medium engine speed and load region that extends to higher engine loads at lower engine speeds. In region B, port throttles are opened to an extent where a smaller pressure drop occurs across the central throttle than a port throttle during an intake stroke of a cylinder receiving air via the port throttle. Such throttle adjustments provide for lower engine pumping work and improved transient engine response since intake manifold pressure is increased toward or above atmospheric pressure. Region B may increase or decrease in size by adjusting curve 204 to extend to the locations of curves 204a or 204b in response to compressor turbine speed. In particular, curve 204 may be extended to the position of curve 204b during conditions when turbine speed is higher so that intake manifold pressure can be reduced and/or such that a pressure drop across the port throttle is reduced with respect to the pressure drop across the central throttle during an intake stroke of the cylinder receiving air via the port throttle. Curve 204 may be extended to the position of curve 204a during conditions when turbine speed is lower than turbine speed that is the basis for curve 204b. When turbine speed is lower than the turbine speeds for curves 204a and 204b, region B extends out to 204 where the pressure drop across the port throttles is decreased relative to the pressure drop across the central throttle during an intake stroke of the cylinder receiving air via the port throttle as compared to curves 204a and 204b. In this way, the engine may be operated at a higher intake manifold pressure in region B by increasing the pressure drop across the port throttles so that an air amount inducted to a cylinder may be increased in a short period of time. Cylinder air pressure may be increased more quickly because less intake manifold filling is necessary to increase cylinder pressure.

Region C is shown as a shaded area that lies below curve 202 and above curve 204. Region C is a high engine speed and load region where port throttles are opened a large amount to allow increased air flow into cylinders. Air flow to engine cylinders is controlled via the central throttle. In particular, a port throttle is opened to an extent where a greater pressure drop occurs across the central throttle than the port throttle.

Figure 3:
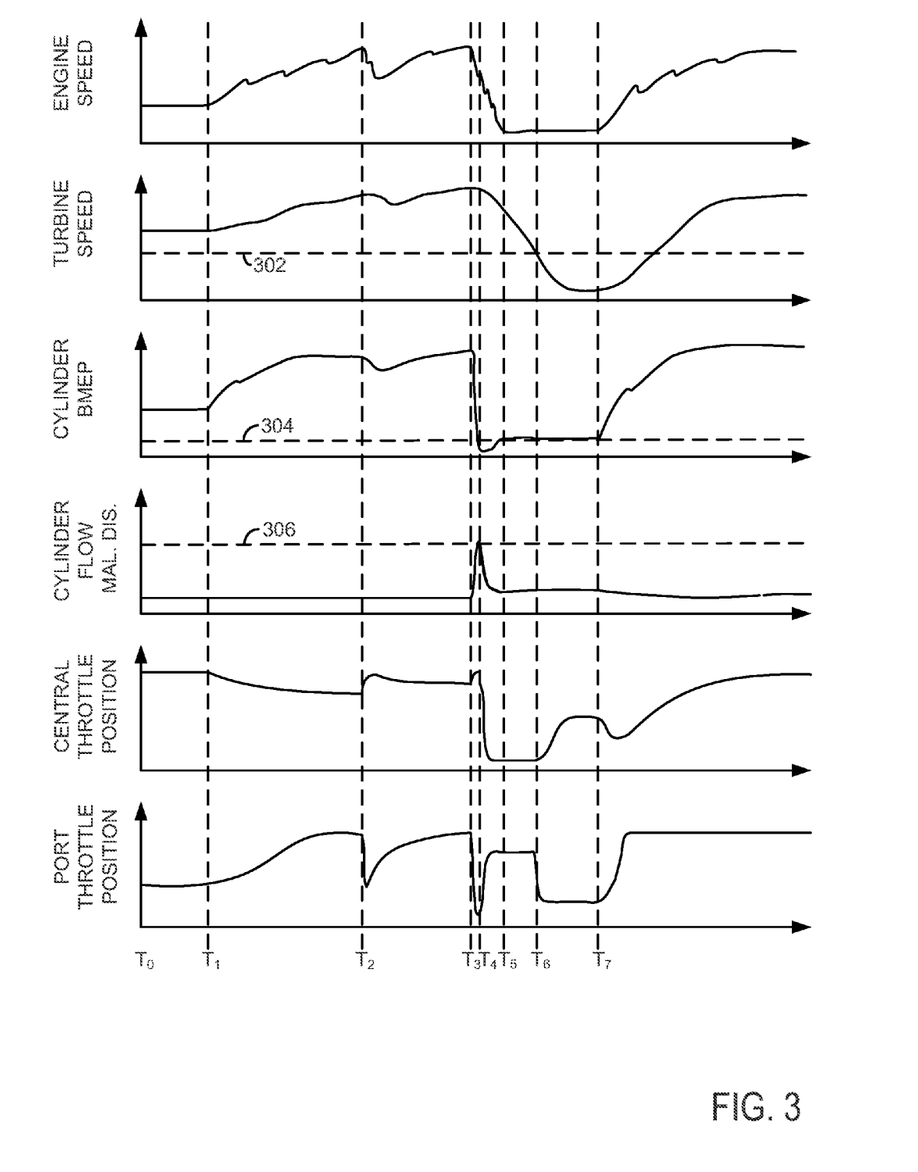
FIG. 3 shows a simulated example of an engine operating sequence.

Referring now to FIG. 3, a simulated example engine operating sequence is shown. The sequence of FIG. 3 may be provided by the system of FIG. 1 executing the method of FIG. 4.

The first plot from the top of FIG. 3 represents engine speed versus time. The Y-axis represents engine speed and engine speed increases in the direction of the Y-axis arrow. The X-axis represents time and time increases from the left side of the plot to the right side of the plot.

The second plot from the top of FIG. 3 represents turbocharger turbine speed versus time. The Y-axis represents turbocharger turbine speed and turbocharger turbine speed increases in the direction of the Y-axis arrow. The X-axis represents time and time increases from the left side of the plot to the right side of the plot. Horizontal line 302 represents a threshold turbine speed where it may be judged that the turbine is spun up to a level where air may be provided to the engine at a desired rate so that there is little turbocharger lag time.

The third plot from the top of FIG. 3 represents engine cylinder brake mean effective pressure (BMEP) versus time. The Y-axis represents BMEP and BMEP increases in the direction of the Y-axis arrow. The X-axis represents time and time increases from the left side of the plot to the right side of the plot. Horizontal line 304 represents a threshold BMEP or cylinder load where it may be judged desirable to have greater pressure drop across the central throttle than the port throttle to reduce cylinder maldistribution.

The fourth plot from the top of FIG. 3 represents engine cylinder flow maldistribution between two engine cylinders. The Y-axis represents engine cylinder flow maldistribution and engine cylinder flow maldistribution increases in the direction of the Y-axis arrow. The X-axis represents time and time increases from the left side of the plot to the right side of the plot. Horizontal line 306 represents a threshold cylinder flow maldistribution limit.

The fifth plot from the top of FIG. 3 represents central throttle position versus time. The Y-axis represents central throttle position and the central throttle opening amount increases in the direction of the Y-axis arrow. The X-axis represents time and time increases from the left side of the plot to the right side of the plot.

The sixth plot from the top of FIG. 3 represents port throttle position versus time. The Y-axis represents port throttle position and port throttle opening amount increases in the direction of the Y-axis arrow. The X-axis represents time and time increases from the left side of the plot to the right side of the plot.

At time $T_0$, engine speed is at a mid-level and turbine speed is greater than a speed that provides a desired engine torque response to an increased engine torque demand. Cylinder BMEP is also at a middle level and cylinder flow maldistribution is at a low level. The central throttle is opened a relatively large amount and the port throttle is opened to a mid-level.

At time $T_1$, the engine load begins to increase as indicted by the increase in cylinder BMEP. The engine speed also increases as the engine load increases. Turbine speed also increases as the engine exhaust flow rate increases. The central throttle position starts to close and the port throttle begins to open. Opening the port throttle increase cylinder air flow and closing the central throttle reduces intake manifold pressure so that the cylinder may be at least partially throttle via the central throttle.

Between time $T_1$ and time $T_2$, the engine load continues to increase and the port throttle opening amount continues to open with increasing engine load. The central throttle opening amount decreases to a level where flow through the central throttle and port throttle provides a desired engine torque level when fuel is combined with the air entering the cylinder. Engine speed and turbine speed also increase while cylinder flow maldistribution remains at a low level.

At time $T_2$, engine load is decreased as indicated by the reduction in BMEP. Engine speed also declines and cylinder maldistribution is at a lower level. Turbine speed remains at a high level, but it begins to decline as exhaust flow declines with lower engine speed and load. The port throttles are closed to reduce cylinder air flow in response to the lower engine load and the central throttle opening amount is increased.

Between time $T_2$ and time $T_3$, the engine load is increased and the cylinder BMEP and engine speed increase in response to the engine load increase. The turbine speed also increases and the cylinder flow maldistribution is at a lower level. The central throttle partially closes and the port throttle opening amount increases.

At time $T_3$, there is a more substantial reduction in engine load. The cylinder BMEP drops at an increased rate and engine speed is reduced with the reduction in BMEP. Turbine speed begins to slow with the reduction in BMEP. The port throttle is partially closed to reduce cylinder air flow, and the central throttle opening amount is increased a small amount.

At time $T_4$, the port throttle opening amount has been reduced to a level where flow distribution between cylinders may increase to a level greater than the cylinder flow distribution threshold 306 as indicated by the cylinder flow maldistribution curve. Further, a pressure drop across the port throttle is greater than a pressure drop across the central throttle during an intake stroke of the cylinder receiving air via the port throttle. The cylinder flow maldistribution level may be inferred based in intake manifold pressure and port throttle position. In one example, cylinder flow maldistribution greater than a threshold level is inferred when intake manifold pressure is greater than a threshold pressure when a port throttle is open less than a threshold level. The port throttle is opened and the central throttle is closed in response to cylinder maldistribution exceeding a threshold level, where the maldistribution level is estimated via port throttle position and intake manifold pressure.

At time $T_5$, the engine reaches idle speed and the cylinder BMEP increases a small amount. Further, cylinder flow maldistribution is reduced as the port throttle opening amount is increased and the central throttle opening amount is decreased. Increasing the port throttle opening amount decreases a pressure drop across the port throttle to a level less than the pressure drop across the central throttle. The turbine speed continues to decline but is remains above a threshold turbine speed 302 where a desired torque response of the engine may be expected.

At time $T_6$, the engine is at idle speed and the turbine speed falls below the threshold turbine speed 302. The central throttle opening amount is increased and the port throttle opening amount is decreased. Opening the central throttle and partially closing the port throttle increases the pressure drop across the port throttle to a level greater than the pressure drop across the central throttle. The intake manifold pressure is also increased so that air is available if an increase in engine torque is requested. Cylinder flow maldistribution remains at a lower level while the port throttle is partially closed and the central throttle opening amount increases.

At time $T_7$, engine load is increased and cylinder BMEP increases at a desirable rate since air is available to engine cylinders without having to fill the intake manifold. The engine speed and turbine speed increase with the increasing BMEP. The port throttle opening amount increases to increase cylinder air flow and the central throttle position is reduced somewhat so that the desired engine load is provided.

Between time $T_7$ and the end of the plot, turbine speed increases to a level above the threshold turbine speed 302 and cylinder flow maldistribution remains at a lower level. The central throttle opening amount also increases to provide the desired level of engine torque.

In this way, a central throttle and port throttles may be adjusted to provide improved torque response and reduce turbocharger delay. Further, port throttles may be adjusted responsive to cylinder maldistribution to improve engine air-fuel ratio control and to provide more uniform torque production at lower engine loads.

Figure 4:
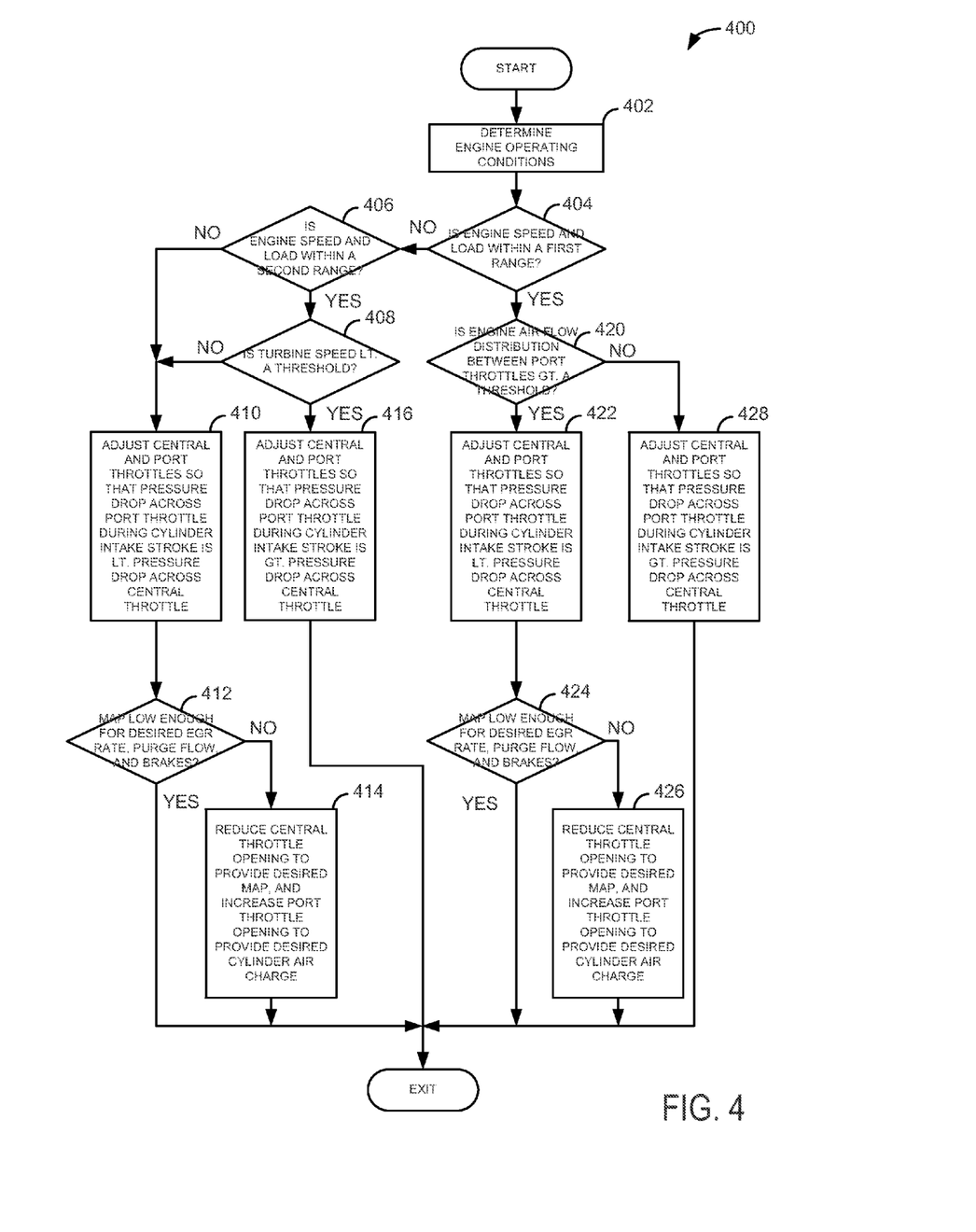
FIG. 4 shows a flowchart of an example method for operating an engine.

Referring now to FIG. 4, a flowchart of an example method for operating an engine is shown. The method of FIG. 4 may be stored as executable instructions in non-transitory memory of controller 12 in the system of FIG. 1. In some examples, the method of FIG. 4 may not execute for a predetermined number of combustion events or time since engine stop so that throttle positions do not respond to starting conditions.

At 402, method 400 determines engine operating conditions. Engine operating conditions may include but are not limited to engine speed, engine load, engine torque demand, intake manifold pressure, turbine speed, and cylinder flow maldistribution. Method 400 proceeds to 404 after engine operating conditions are determined.

At 404, method 400 judges whether or not engine speed and load are within a first speed and load range. In some examples, engine load may be determined as a ratio of cylinder air capacity to cylinder air amount. In other examples, BMEP may be used as a surrogate for engine load. In one example, the engine speed and load may be within the first speed and load range when the engine is operated in a range similar to region A of FIG. 2. If method 400 judges that engine speed and load are within a first range, the answer is yes and method 400 proceeds to 420. Otherwise, the answer is no and method 400 proceeds to 406.

At 420, method 400 judges whether or not engine air-flow distribution between port throttles (or engine cylinders) is greater than a threshold level. If there is a flow difference between cylinders that is greater than a threshold level, the answer is yes and method 400 proceeds to 422. Otherwise, the answer is no and method 400 proceeds to 424.

It should be noted that flow distribution between engine cylinders may be estimated via intake manifold pressure and port throttle position via empirically determined cylinder flow values stored in a table in memory. The table may be indexed via intake manifold pressure and port throttle position. Alternatively, cylinder maldistribution may be estimated via output of an oxygen sensor via sensing differences in exhaust oxygen concentrations expelled from engine cylinders. The greater the oxygen difference in exhaust gases expelled from engine cylinders, the greater the flow distribution difference. In still another example, flow distribution between engine cylinders may be estimated via engine speed. In particular, the difference in engine speed between cylinders after combustion in the cylinders is compared. The difference in engine speed after combustion is an indication of the level of cylinder flow maldistribution. In still other examples, cylinder flow maldistribution may be determined via cylinder pressure transducers. Cylinders having excess air amount due to flow distribution differences may combust a lean mixture in the cylinder and reducing cylinder torque. If a pressure difference between cylinders exceeds a threshold level, it may be estimated that the flow distribution difference between engine cylinders has exceeded a threshold.

At 424, method 400 judges whether or not MAP is low enough for desired EGR rate, purge flow, and brakes. If so, the answer is yes and method 400 proceeds to exit. Otherwise, the answer is no and method 400 proceeds to 426.

At 426, method 400 reduces the central throttle opening to provide desired MAP and increases port throttle opening to provide a desired cylinder air charge. Method 400 proceeds to exit after 426.

At 422, method 400 adjusts the central throttle position and the port throttle position so that a pressure drop across the port throttle during an intake stroke of the cylinder inducting air via the port throttle is less than a pressure drop across the central throttle during the intake stroke. However, in some examples, the port throttle opening amount may be increased and the central throttle closing amount increased in response to increasing flow maldistribution between engine cylinders. In this way, the flow to engine cylinders becomes less influenced by the port throttles and more influenced by the central throttle. The combination of port and central throttle adjustments also provides for a desired level of cylinder air that corresponds to an amount of air to provide a desired engine torque. Method 400 proceeds to exit after the central throttle and port throttle are adjusted.

At 428, method 400 adjusts the central throttle position and the port throttle position so that a pressure drop across the port throttle during an intake stroke of the cylinder inducting air via the port throttle is greater than a pressure drop across the central throttle during the intake stroke. However, in some examples, the port throttle closing amount may be increased and the central throttle opening amount increased in response to decreasing flow maldistribution between engine cylinders. In this way, the flow to engine cylinders becomes less influenced by the central throttle and more influenced by the port throttles. The combination of port and central throttle adjustments also provides for a desired level of cylinder air that corresponds to an amount of air to provide a desired engine torque. Method 400 proceeds to exit after the central throttle and port throttle are adjusted.

At 406, method 400 judges whether or not engine speed and load are within a second range. In one example, the second engine speed and load range may be similar to the speed and load range indicated as region B in FIG. 2. If method 400 judges that engine speed and load are within a second range, the answer is yes and method 400 proceeds to 408. Otherwise, the answer is no and method 400 proceeds to 410.

At 408, method 400 judges whether or not turbocharger turbine speed is less than a threshold speed. The threshold turbine speed may vary depending on the application and operating conditions. In one example, the threshold turbine speed is a turbine speed above which it may be expected that a desired engine torque may be provided. If it is judged that the turbine speed is less than a threshold speed, the answer is yes and method 400 proceeds to 412. Otherwise, the answer is no and method 400 proceeds to 410.

At 412, method 400 judges whether or not MAP is low enough for desired EGR rate, purge flow, and brakes. If so, the answer is yes and method 400 proceeds to exit. Otherwise, the answer is no and method 400 proceeds to 426.

At 414, method 400 reduces the central throttle opening to provide desired MAP and increases port throttle opening to provide a desired cylinder air charge. Method 400 proceeds to exit after 426.

At 410, method 400 adjusts the central throttle position and the port throttle position so that a pressure drop across the port throttle during an intake stroke of the cylinder inducting air via the port throttle is less than a pressure drop across the central throttle during the intake stroke. However, in some examples, the port throttle opening amount may be increased and the central throttle closing amount increased in response to increasing flow maldistribution between engine cylinders. In this way, the intake manifold pressure may be decreased and a desired engine torque response provided since turbine speed is at a higher level which permits rapid torque response. Further, opening the port throttle may reduce engine pumping work at higher engine speeds and loads. The port and central throttle adjustments also provides for a desired level of cylinder air that corresponds to an amount of air to provide a desired engine torque. Method 400 proceeds to exit after the central throttle and port throttle are adjusted.

At 416, method 400 adjusts the central throttle position and the port throttle position so that a pressure drop across the port throttle during an intake stroke of the cylinder inducting air via the port throttle is greater than a pressure drop across the central throttle during the intake stroke. However, in some examples, the port throttle closing amount may be increased and the central throttle opening amount increased in response to turbine speed. In this way, intake manifold pressure may be raised so that air is available to engine cylinders at a faster rate than if intake manifold pressure where at a lower level. The combination of port and central throttle adjustments also provides for a desired level of cylinder air that corresponds to an amount of air to provide a desired engine torque. Method 400 proceeds to exit after the central throttle and port throttle are adjusted.

In this way, the method of FIG. 4 provides for adjusting a central throttle and port throttles to provide improved transient torque response and reduced possibility of cylinder to cylinder maldistribution (e.g., cylinder to cylinder air amount differences during an engine cycle). As a result, engine performance and emissions may be at least partially improved.

As will be appreciated by one of ordinary skill in the art, the method described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating on natural gas, gasoline, diesel, or alternative fuel configurations could use the present description to advantage.

The invention claimed is:

1. A method for operating an engine including a central throttle, a plurality of port throttles, an air flow sensor, and a controller respectively operatively connected thereto, comprising:
measuring an air flow being delivered to the engine by the air flow sensor;
judging if a flow distribution difference between the plurality of port throttles is greater than a threshold flow distribution difference and if the measured engine air flow is less than a threshold air flow via the controller; and
increasing an opening amount of at least one of the plurality of port throttles while decreasing an opening amount of the central throttle in response to the judgement.

2. The method of claim 1, where the flow distribution difference between the plurality of port throttles is estimated via engine speed.

3. The method of claim 1, where the flow distribution difference between the plurality of port throttles is estimated via an exhaust gas oxygen sensor.

4. The method of claim 1, where the flow distribution difference between the plurality of port throttles is estimated via intake manifold pressure and a position of the port throttle.

5. The method of claim 1, further comprising operating the engine with a pressure drop across one of the plurality of port throttles that is greater than a pressure drop across the central throttle in response to the flow distribution difference between the plurality of port throttles being less than the threshold flow distribution difference.

6. The engine operating method of claim 1, further comprising not increasing the opening amount of the at least one of the plurality of port throttles and not decreasing the opening amount of the central throttle for a predetermined number of combustion events since engine stop.

7. The engine operating method of claim 1, where the flow distribution difference between the plurality of port throttles is estimated via intake manifold pressure and a port throttle position of the at least one of the plurality of port throttles.

8. A method for operating an engine including a central throttle, a plurality of port throttles, a turbine having a turbine speed, and a controller being in respective operable connection thereto, comprising:
in a first mode at a first engine speed and a first torque demand, adjusting a position of the central throttle and adjusting a position of at least one of the plurality of port throttles so that a greater pressure drop occurs across the at least one of the plurality of port throttles than the central throttle in response to the turbine speed being less than a threshold as judged by the controller; and
in a second mode at the first engine speed and the first torque demand, adjusting the position of the central throttle and adjusting the position of at least one of the plurality of port throttles so that a greater pressure drop occurs across the central throttle than the at least one of the plurality of port throttles in response to the turbine speed being greater than the threshold as judged by the controller.

9. The method of claim 8, where the first engine speed and the first torque demand are less than a threshold engine speed and a threshold torque demand.

10. The engine operating method of claim 8, further comprising increasing an opening amount of the at least one of the plurality of port throttles and decreasing the opening amount of the central throttle in response to a judgement, via the controller, of a flow distribution difference between the plurality of port throttles greater than a threshold flow distribution difference and a measured engine air flow less than a threshold air flow.

11. The engine operating method of claim 8, where the greater pressure drop across the central throttle than the at least one of the plurality of port throttles occurs during an intake stroke of a cylinder of the engine being supplied air via the at least one of the plurality of port throttles.

12. The engine operating method of claim 8, where the greater pressure drop across the at least one of the plurality of port throttles than the central throttle occurs during an intake stroke of a cylinder of the engine being supplied air via the at least one of the plurality of port throttles.

13. The engine operating method of claim 8, where the central throttle is located in an engine air intake path upstream of the plurality of port throttles.

14. A system for controlling an engine, comprising:
a turbocharger, a central throttle, and a plurality of port throttles, and the engine; and a controller including executable instructions stored in non-transitory memory for operating the central throttle and the plurality of port throttles responsive to a turbocharger turbine speed.

15. The system of claim 14, further comprising additional instructions stored in non-transitory memory for adjusting the central throttle and at least one of the plurality of port throttles so that a greater pressure drop occurs across the at least one of the plurality of port throttles than the central throttle during a first intake stroke of a cylinder of the engine that receives air via the at least one of the plurality of port throttles in response to the turbocharger turbine speed being less than a threshold.

16. The system of claim 15, further comprising additional instructions stored in non-transitory memory for operating the central throttle and the at least one of the plurality of port throttles so that a greater pressure drop occurs across the central throttle than the at least one of the plurality of port throttles during a second intake stroke of the cylinder receiving air via the at least one of the plurality of port throttles in response to the turbocharger turbine speed being greater than the threshold.

17. The system of claim 14, further comprising additional instructions stored in non-transitory memory for increasing an opening amount of the central throttle and for increasing an opening amount of at least one of the plurality of port throttles in response to a judgement, via the controller, of a flow distribution difference between the plurality of port throttles being greater than a threshold.

18. The system of claim 17, where the additional instructions stored in non-transitory memory increase an opening amount of each of the plurality of port throttles in response to the flow distribution difference being greater than the threshold.

19. The system of claim 18, where the additional instructions stored in non-transitory memory increase a closing amount of each of the plurality of port throttles in response to the flow distribution difference being less than the threshold.

* * * * *